(12) United States Patent
Ryan, Jr.

(10) Patent No.: US 6,938,016 B1
(45) Date of Patent: Aug. 30, 2005

(54) DIGITAL COIN-BASED POSTAGE METER

(75) Inventor: Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 966 days.

(21) Appl. No.: 09/633,916

(22) Filed: Aug. 8, 2000

(51) Int. Cl.$^7$ .............................................. G06F 17/60
(52) U.S. Cl. ............................ 705/60; 705/39; 705/41; 713/176; 707/78
(58) Field of Search ..................................... 705/60, 11

(56) References Cited

U.S. PATENT DOCUMENTS

| | | | |
|---|---|---|---|
| 5,696,829 A | 12/1997 | Cordery et al. ............... | 380/55 |
| 5,781,438 A | 7/1998 | Lee et al. .............. | 364/464.14 |
| 6,341,273 B1 * | 1/2002 | Briscoe ....................... | 705/41 |
| 6,424,954 B1 * | 7/2002 | Leon .......................... | 705/401 |

* cited by examiner

*Primary Examiner*—James P. Trammell
*Assistant Examiner*—John M Winter
(74) *Attorney, Agent, or Firm*—Brian A. Lemm; Angelo N. Chaclas

(57) ABSTRACT

A system and corresponding method for enabling the use of digital postage or, more generally, digital coin. The system includes, in the case of enabling digital postage, a digital postage generator, responsive to a request for digital postage, and further responsive to an initial pointer value, for providing a supply of digital postage, and further for providing verifying data for use in verifying portions of the digital postage when imprinted on mailpieces, wherein the digital postage is based on a random sequence of bits, wherein the digital postage generator includes a bitstream generator for providing a random sequence of bits associated with the initial pointer value, and also includes a digital postage manager for providing as the digital postage the random sequence of bits and the initial pointer value, and for providing as verifying data information indicating at least a portion of the random sequence of bits. In some applications, the information indicating at least a portion of the random sequence of bits includes the initial pointer value and the random sequence of bits. Also in some applications, the digital postage generator is further responsive to a key value and the bitstream generator provides the random sequence of bits based on the key value and the initial pointer value, and the information indicating at least a portion of the random sequence of bits includes the key value and the initial pointer value.

20 Claims, 3 Drawing Sheets

DIGITAL COIN-BASED POSTAGE METER

TECHNICAL FIELD

The present invention pertains to the field of providing postage for mail pieces, and more particularly to providing such postage in a way that is secure against fraud. More generally, it is also directed to providing prepayment for a transaction, not necessarily connected with providing postage (i.e., for example providing digital cash for use in e-commerce), in a way that is secure against fraud so as to enable the transaction.

BACKGROUND OF THE INVENTION

The digital-signature-based postage metering systems proposed by various postal systems, e.g. those based on the Information-based Indicia (IBI) Program being developed by the United States Postal Service, have placed a premium on the protection of cryptographic keys. (See, e.g. draft PERFORMANCE CRITERIA FOR INFORMATION-BASED INDICIA AND SECURITY ARCHITECTURE FOR OPEN IBI POSTAGE EVIDENCING SYSTEMS, dated Feb. 23, 2000, by the United States Postal Service.) A compromise of these keys allows an attacker to produce indicia that verify cryptographically, but have not been paid for. A sophisticated attacker could perpetrate a significant amount of fraud before being detected. To guard against such fraud, the proposed digital-signature-based postage metering systems often include the requirement that meters be physically secure against sophisticated attacks, such as physical penetration or differential power analysis, leading to increased meter cost.

But despite such precautions, there is a basic flaw in digital-signature-based postage systems not addressed by the requirements now under consideration: a meter contains the secret information, including cryptographic keys, used to authenticate all transactions (including imprinting postage on a mailpiece), and a meter owner has no stake in protecting the secret information. More importantly, a dishonest owner of a meter has every incentive to determine the cryptographic keys stored in the meter. In other words, digital-signature-based postage metering systems place the information needed to guard against fraud in the least secure environment: the meter, located at the customer site. In recognition of the flaw, postal systems have considered various stringent meter security requirements, which increase the cost of using a meter.

What is needed is a system that does not store in a meter all of the secret information used to authenticate transactions using the meter.

SUMMARY OF THE INVENTION

Accordingly, the present invention provides a system and corresponding method for enabling the use of digital postage or, more generally, digital coin, the system comprising, in the case of enabling digital postage, a digital postage generator, responsive to a request for digital postage, and further responsive to an initial pointer value, for providing a supply of digital postage, and further for providing verifying data for use in verifying portions of the digital postage when imprinted on mailpieces, wherein the digital postage is based on a random sequence of bits, wherein the digital postage generator includes a bitstream generator for providing a random sequence of bits associated with the initial pointer value, and also includes a digital postage manager for providing as the digital postage the random sequence of bits and the initial pointer value, and for providing as verifying data information indicating at least a portion of the random sequence of bits.

In a further aspect of the invention, the information indicating at least a portion of the random sequence of bits includes the initial pointer value and the random sequence of bits.

In another, further aspect of the invention, the digital postage generator is further responsive to a key value and the bitstream generator provides the random sequence of bits based on the key value as well as the initial pointer value, and wherein the information indicating at least a portion of the random sequence of bits includes the key value and the initial pointer value. In some such applications, the random sequence of bits is generated as portions of one or more random sequences of bits, each sequence based on the same initial pointer value but with the initial pointer value incremented for a successive sequence by an amount equal to the number of bits in the previous sequence. The random sequence of bits may be generated, for example, based on the so-called triple data encryption standard (3DES).

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION

Basic Embodiment

Figure 1:
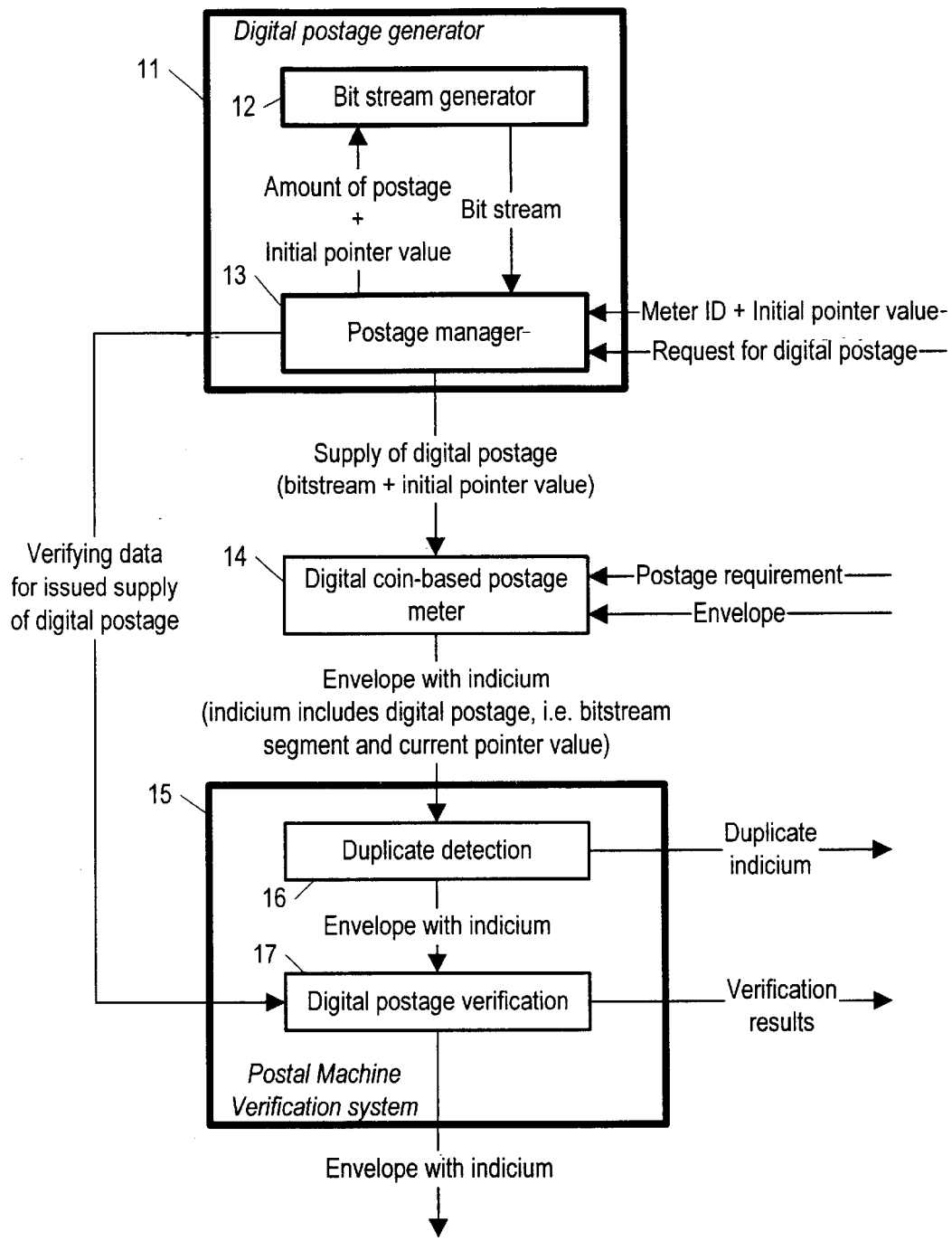
FIG. 1 is a block diagram/ data flow diagram of a basic embodiment of a system according to the present invention for providing digital postage.

Referring now to FIG. 1, a system for enabling the use of digital postage is shown as including a digital postage generator 11 at a data center that accepts a request for digital postage for a specified meter and provides a supply of digital postage and verifying data for the issued supply of digital postage. The digital postage is preferably provided as a random sequence of bits (a bitstream), each and every bit representing the same value (or coin) in paying for postage. For example, each bit could represent one cent worth of postage. The bitstream may be represented in any suitable form (e.g. characters or barcode), but a two-dimensional barcode is preferable. The verifying data includes the meter identifier, a pointer value (used in generating the digital postage as explained below), and either the bitstream or information needed to generate the bitstream.

Since the bits of the bitstream each have a certain value as postage, just as a certain denomination coin has a certain value, the system of the present invention is called here a digital-coin-based system.

A digital coin-based postage meter 14 receives the supply of digital postage and in response to a postage requirement will imprint on a mailpiece a portion of the digital postage, i.e. a certain number of the bits (in order) of the bitstream issued as digital postage (e.g. 33 bits for 33 cents worth of postage), advancing the pointer to the next unused bit and so using up the digital postage in the process of imprinting digital postage on successive mailpieces. The meter will also imprint on the mailpiece the meter identifier and the pointer value pointing to the first bit of the issued bitstream used on the envelope. Because the postage is provided as a bitstream (random sequence of bits), and the bitstream is used as verifying information, there is nearly zero likelihood that a bitstream could be successfully counterfeited, provided that the number of bits used as postage is always appropriately large, say at least five bits.

In order to add postage to a meter, a bitstream must be downloaded from the digital postage generator 11 to the meter 14. It is in the interest of the meter owner (as well as of the operator of the issuer of the digital postage) that the download be performed securely. Any exposure of the bitstream to a third party during the download could allow the third party to use the bitstream before the meter owner. Therefore, standard cryptographic (e.g., a secure subscriber line connection) or procedural techniques (e.g. a private connection such as a direct phone line or courier service) should be used to ensure the privacy of the downloaded bits. The number of bits downloaded to the meter will depend upon the amount of postage being downloaded. For example, if each bit is worth one cent and a $100.00 download is requested, then 10,000 bits (1250 bytes) will be downloaded to the meter. Using a standard 9600 baud modem connection, the time required to download the bits would be less than 2 seconds.

When the envelope arrives at a postal machine verification system 15, it is first examined by a duplicate detection module 16, which checks whether the indicium on the envelope, or any part of such an indicium, is a duplicate of an indicium imprinted on another envelope already examined. (It is necessary to check that even part of an indicium has not been duplicated to guard against an attacker printing a legitimate indicium worth a high value, e.g. $9.90, and then reusing only portions of the indicium, e.g. portions worth 33 cents.) In case the indicium is determined to be a duplicate, it is provided by the duplicate detection module 16 to a postal inspector to investigate for fraud. If the envelope is determined not to have a duplicate indicium, it is provided to a digital postage verification module 17. The digital postage verification module 17 uses the verifying data it received from the digital postage generator 11 to verify the digital postage, i.e. to check that it is unused, paid for digital postage, and so not, for example, a fabrication. The digital postage verification module 17 typically reports verification results to a controller (not shown) that may command that an envelope with indicia determined to be invalid be outsorted (not delivered), and so available for examination by a fraud inspector. Although the duplicate detection module 16 is shown as preprocessing indicia, it is sometimes advantageous instead to perform duplicate detection after the digital postage verification module 17 completes its examination.

Still referring to FIG. 1, in a first, basic embodiment, the digital postage generator 11 includes a bitstream generator 12 and a postage manager 13. The postage manager 13 receives the request for digital postage and an indicator of the meter identifier. The postage manager 13 also receives (via a known process that is not the subject of the invention) a pointer offset, which will be used as an initial pointer value for pointing to a location in a random sequence of bits to be used as the supply of postage, a sequence of bits that might for example be generated by a noisy diode or by seeding a random number generator. The postage manager 13 provides the initial pointer value and the requested amount of digital postage (i.e. the amount requested, not the postage itself) to the bitstream generator 12, which then generates a random sequence of bits (bitstream) corresponding in length to the amount of postage requested. The initial pointer value is, optionally, used a seed by the bitstream generator.

The initial pointer value associated with a new bitstream, which is provided to the customer with the new bitstream, has a value corresponding to the combined length of all previous bitstreams (if any) purchased by the same customer. The random sequence of bits is provided to the postage manager 13 which in turn provides it to the digital coin-based postage meter 14 along with the initial pointer value. The random sequence of bits in combination with a pointer value (initial or current) is here called digital postage.

In this first, basic embodiment, the verifying data provided by the postage manager 13 to the postal machine verification system 15 (used to verify the digital postage applied to a mailpiece) are the bitstream itself along with the meter identifier and also the initial pointer value (i.e. the initial pointer value). The verification system 15 stores the (new) bitstream with the initial pointer value under the meter identifier, along with all other bitstreams and initial pointer values received earlier for the same meter identifier When postage on a mailpiece is later to be verified, the verification system reads the pointer value and meter identifier indicated on the mailpiece, and then finds the bitstream on file for the meter identifier having an associated initial pointer value that is closest to, but less than the pointer value indicated on the mailpiece than any other initial pointer value on file for the same meter identifier. After finding the bitstream to be used in verifying the bitstream segment used as digital postage, the verification system 15 subtracts the initial pointer value associated with the verifying bitstream from the pointer value on the mailpiece and locates where in the verifying bitstream to compare with the bitstream segment on the mailpiece.

Preferred Embodiment

Figure 2:
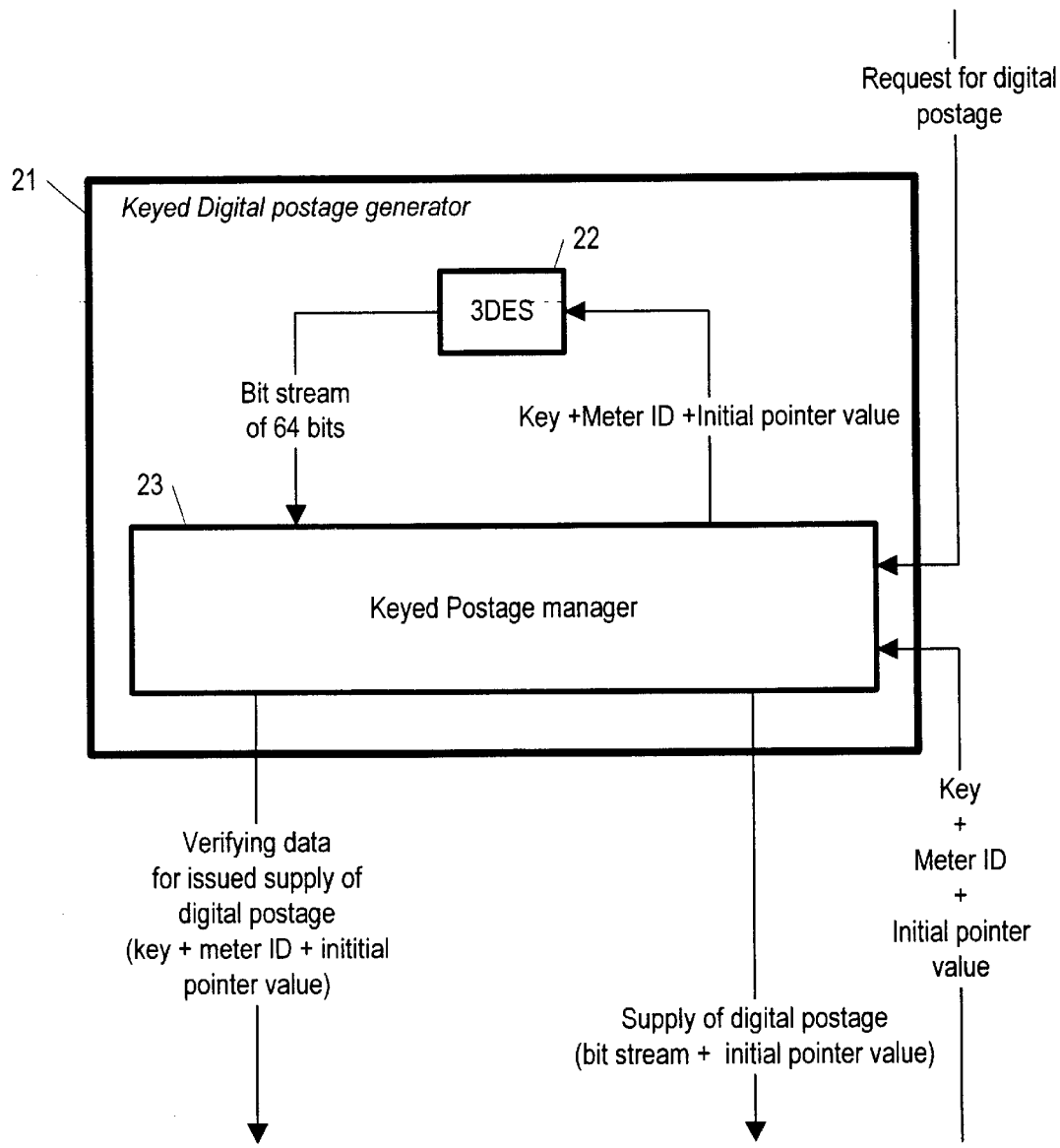
FIG. 2 is a block diagram/ data flow diagram of an alternative, preferred embodiment of the present invention.

Referring now to FIG. 2, in another embodiment of the present invention, the preferred embodiment, the digital postage is provided again in the form of a bitstream (random sequence of bits) and an initial pointer value, but the verifying data does not include the bitstream. Instead, it includes the information needed by the digital postage verification module 17 to recreate the bitstream and to find the location in the bitstream that should be the beginning of the bitstream segment appearing on the mailpiece being verified. In this preferred embodiment, the digital postage generator 11 (FIG. 1) of the basic embodiment is replaced by a keyed digital postage generator 21 including a keyed postage manager 23 and a triple-data encryption standard (3DES) module 22. As in the basic embodiment, the keyed postage manager 23 accepts a request for digital postage, and receives the meter identifier for which the digital postage is to be provided along with the request. In addition, as in the basic embodiment, the keyed postage manager receives an initial pointer value. However, unlike in the basic embodiment, the keyed postage manager also receives a secret key to be used by the 3DES module 22 in generating one or more bitstreams, as is explained below, that will be used as the requested digital postage. In generating the one or more bitstreams, the initial pointer value is used as a seed.

The 3DES module 22 uses the initial pointer value and the key, in combination, to generate a bitstream of 64 bits. The keyed postage manager 23 prompts the 3DES module 22 to produce as many such bitstreams as are required to provide the requested digital postage. In the event that the digital postage requested by a consumer does not correspond to an integral number of 64 bit-long bitstreams, the excess bits are, preferably, simply discarded, although in some applications it is advantageous to preserve the excess bitstream for later sale to the (same) consumer. For each 64-bit-long sequence of bits required of the 3DES module 22, the initial pointer value is incremented by 8 bytes (64 bits) and used as a seed for the next 64bit-long sequence.

With the use of the secret key, the actual bitstream need not be provided to the verification module. Instead, in the preferred embodiment, the verifying data for an issued supply of digital postage includes the key value, the meter identifier, and the initial pointer value. In the preferred embodiment, the digital postage verification module 17 (FIG. 1) also includes a 3DES module that can generate the bitstream needed to authenticate the bitstream serving as postage for a mailpiece. Since the indicium on the mailpiece includes not only the bitstream for the postage, but also the meter identifier and the pointer value, incremented by the digital coin-based postage meter 14 as postage is used up, the digital postage verification module 17 is able to determine what pointer value (or pointer values) to use so as to produce the bitstream needed to authenticate the bitstream segment appearing on the mailpiece.

For example, if the indicium on the mailpiece indicates that the pointer value is 60 bits greater than the initial pointer value, and the digital postage applied to the mailpiece is 60 bits, then the digital postage verification module 17 would know that bits 1–5 of the postage correspond to bits 60–64 of the original bitstream, and that these bits must be generated with the (unincremented) initial pointer value (and the secret key), but that the next 55 bits are to be generated using the initial pointer value incremented by 8 bytes.

Figure 3:
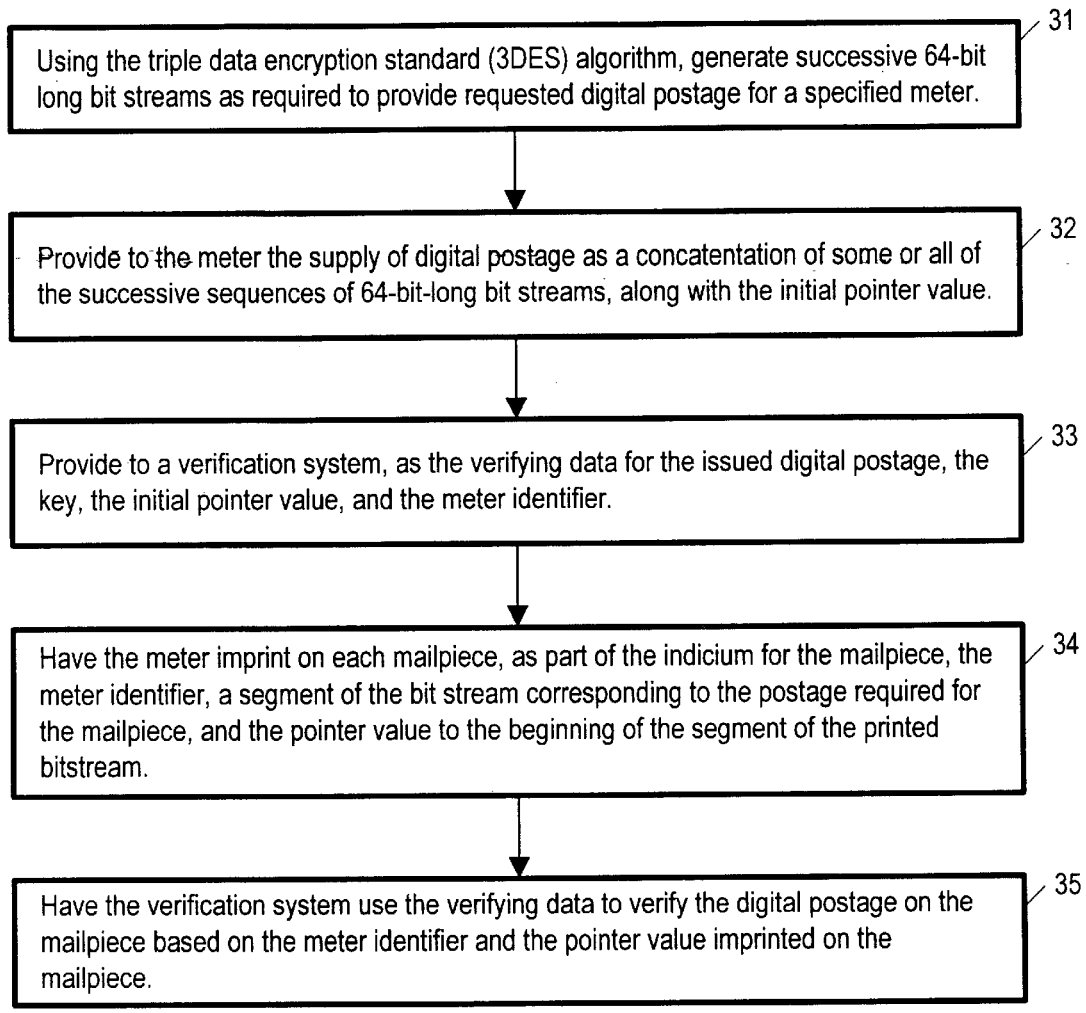
FIG. 3 is a flowchart showing the method of the present invention in the alternative embodiment.

Referring now to FIG. 3, a method for enabling the use of digital postage according to the preferred embodiment is shown as including a step 31 in which multiples of 64bit-long bitstreams are generated as in 3DES and using the same key for each bitstream, with enough bitstreams so as to provide the requested supply of digital postage. In a next step 32, the digital postage is provided as the concatenation of successive 64-bit-long bitstreams, discarding a portion of the last such bitstream in case the requested digital postage does not correspond to an integral number of 64-bit-long bitstreams. Next, in a step 33, verifying data to be used in authenticating the digital postage is provided, the verifying data including the key, the initial pointer value and the meter identifier. In a next step 34, the meter imprints on a mailpiece, as part of the indicium for the mailpiece, the meter identifier, a segment of the bitstream corresponding to the postage required for the mailpiece, and the pointer value to the beginning of the segment of the printed bitstream. In a last step 35, the verification system verifies the postage imprinted on the mailpiece based on the meter identifier, and also based on the pointer value imprinted on the mailpiece, as explained above. The verification system uses the meter identifier to look up the key and the initial pointer value to be used to generate the bitstream needed to authenticate the digital postage. The (current) pointer value imprinted as part of the indicium is used by the verification system to determine where in the bitstream generated by the verification system to begin comparing with the bitstream imprinted on the mailpiece.

Other Embodiments

An extension of the techniques used in the above embodiments is to use several methods to generate different portions of a bitstream. For example, in some applications it is advantageous to use a bitstream that is the result of interleaving two bitstreams, each generated using a different method. For example, the two bitstreams could be generated using 3DES as described above with two different key sets, one to produce the odd bits and the other to produce the even bits.

A variant of the two verification methods described above (one in which the bitstream is provided to the verification module 17 and the other in which the key is provided) provides only partial information to the verification sites, such as only part of the bitstream (e.g. every third bit). An alternative is to generate a bitstream using a number of different keys, using each key to produce only a part of the bitstream. For example, two keys could be used to produce two interleaved bitstreams, and only one of the keys would be provided to the verification module 17. The advantage of providing only partial information to the verification module 17 is that no verification site then has enough information to generate a complete valid bitstream. A disadvantage is that the entire bitstream cannot be validated at a verification site. However, enough of the bits can be verified to provide a high level of assurance that an indicium is in fact valid. It is important to note that as the value of an indicium increases, the level of assurance that the indicium is valid also increases using any of the approaches to verification described here. In addition, sampled indicium could also be provided back to the data center, which could then provide a second level of verification by verifying the bits that were not verified by the verification module 17 (usually remote from the data center). The second level verification could be done in batch mode or in real time or according to any other schedule that would ensure meeting the security requirements of a Post.

In another embodiment, the data in an indicium is digitally signed. Thus, the (human readable) date of imprinting of the indicium is then signed along with the bitstream, reducing the time when a copy attack is possible. One way to sign the data of an indicium is to use a secret key held only at the data center. The data center would provide the cryptographic verification, while the verification sites would verify the bitstream. Thus, even if the key were compromised, an attacker could only reuse portions of the bitstream.

In yet another embodiment, the postage manager 13 concatenates the initial pointer value, bitstream and other variable data of an indicium (e.g., the date and destination zip code) and creates a hash of the concatenation. The resulting hash would be printed along with the (current) pointer value, meter identifier and variable data in the indicium. A verification site could recreate the hash using the information printed in the indicium and the proper portion of the bitstream (either stored or generated in the data center as described above). In this embodiment, the bitstream does not need to be printed in the indicium and therefore is never exposed to the outside world. As a result, a recipient of an indicium would not be able to determine and reuse the bitstream. This embodiment also has the advantage that the size of an indicium for a high-value digital postage has less of a footprint, since the concatenation is the same size for all indicia, and is smaller than for indicia with high-value digital postage.

Finally, there are applications where using a bit to represent the smallest possible postage unit would require a large amount of storage for typical amounts of postage required for a mailpiece. For example, postage is sometimes required to be printed in tenths of a cent, e.g. to take advantage of postal discounts. In such applications, multiple bitstreams could be used, such as one representing cents and the other representing tenths of a cent, and each bitstream and its associated pointer could be printed as part of an indicium.

The total postage for a mailpiece with multiple bitstreams would then be the sum of all the bitstreams imprinted on the mailpiece.

The present invention also comprehends embodiments in which a single bitstream is generated and then portions of it are provided to different customers. In addition, each customer receives an initial pointer value pointing to the location in the single bitstream where the portion provided to the customer was extracted. For verifying data, only the single bitstream need be used; neither the initial pointer value provided to the customer nor the meter identifier is needed. When a mailpiece is to be verified, the current pointer value indicated on the mailpiece is used to find in the single bitstream where to look to verify the bitstream segment used as postage for the mailpiece.

Advantages

One security advantage of the invention is that the digital postage meter does not have the information needed to produce valid indicia beyond the bits that are downloaded to it. As a result, compromise of a meter's security only allows an attacker to apply postage that has already been paid for. An attacker could apply this postage to several envelopes. However, the same result could also be accomplished by simply copying indicia in a digital-signature-based system, and so in the present invention, as well as in digital-signature-based system, the verification system should detect duplicate indicia.

Another security advantage is that the meter owner has a stake in maintaining the secrecy of the "digital coins" (bitstream) in the meter. The bits stored in the meter can be thought of as cash in a wallet. Once the bits are "spent" (whether by the meter owner or another party) they are gone and cannot be used again. Therefore, the meter owner has a stake in protecting the information.

Yet another aspect of the invention is that the resulting indicia is relatively small in size. A standard one-ounce first class letter indicia would contain 14 bytes for the meter identification, 4 bytes for the pointer, and 33 bits for the postage amount for a total of 23 bytes of data not including error correction and symbology overhead. Even for a high value item, e.g. a $10.00 item, the indicia grows to only 143 bytes.

The difference in size also provides additional benefits. Higher value indicia are larger than smaller value indicia. This provides a visual indication to a postal worker as to the postage paid and can be used as a first pass to detect mis-rated mail. Also, a higher value indicium provides more assurance than a lower value indicium, due to the greater number of bits used. This is important if not all of the bits in the indicium are verified (one of the options described in the verification section).

A further advantage of the system is the lower cost of implementation. Digital-signature-based postage payment systems require the use of secure coprocessors in order to meet both performance and security requirements. A digital-coin-based postage system does not require real-time digital signature generation by a meter, since the postage is stored as a bitstream. Therefore the crypto-coprocessor needed for a digital-signature-based postage payment system may be replaced by relatively inexpensive non-volatile memory. Depending on the meter, the non-volatile memory may be in the form of integrated circuits, a floppy disk, or other media.

Another advantage is that the bitstream may be either pre-calculated or calculated on an as needed basis by the digital postage generator 11 at the data center. The ability to pre-calculate the bitstream is a major advantage in applications where many users might contact the data center at the same time (e.g., in an online implementation of the digital postage generator 11) or where secure cryptographic processing is not available (e.g., in Postage-by-Phone™ systems). The processing required to generate signed postage value download messages (as in the USPS IBI program) is significantly greater than the processing required to simply download a bitstream. By pre-calculating bitstreams using spare CPU cycles, the cost of the data center can be significantly reduced.

Scope of the Invention

It is to be understood that the above-described arrangements are only illustrative of the application of the principles of the present invention. In particular, the present invention is intended to comprehend being used to provide metering in case of payments for other than postage, such as in case of payments for coupons or tickets or for use in systems providing digital cash for use in e-commerce. In other words, the present invention is intended to comprehend applications as a general transaction evidencing system, which may be paperless, in any situation in which transactions are accomplished using a digital data object to indicate prepayment for a transaction so as to enable the transaction. Numerous other modifications and alternative arrangements may be devised by those skilled in the art without departing from the spirit and scope of the present invention, and the appended claims are intended to cover such modifications and arrangements.

What is claimed is:

1. A system for enabling the use of digital postage comprising:
   a digital postage generator, responsive to a request for digital postage, for providing a supply of digital postage based on a random sequence of bits, and further for providing verifying data for use in verifying portions of the digital postage when imprinted on mailpieces, the digital postage generator including a bitstream generator for providing a random sequence of bits associated with an initial pointer value and having a length corresponding to the amount of digital postage requested; and
   a digital postage manager for providing as the digital postage the random sequence of bits and the initial pointer value, and for providing as verifying data information indicating at least a portion of the random sequence of bits.

2. The system of claim 1, wherein the information indicating at least a portion of the random sequence of bits includes the initial pointer value and at least a portion of the random sequence of bits.

3. The system of claim 1, wherein the digital postage generator is further responsive to a key value and the bitstream generator provides the random sequence of bits based on the key value as well as the initial pointer value, and wherein the information indicating at least a portion of the random sequence of bits includes the key value and the initial pointer value.

4. The system of claim 3, wherein the random sequence of bits is generated as portions of one or more random sequences of bits, each sequence based on the same initial pointer value but incremented by a predetermined number of bits for each successive sequence.

5. The system of claim 4, wherein the random sequence of bits is generated based on a triple data encryption.

6. A method for enabling the use of digital postage, comprising the steps of:
   a) receiving a request for a certain amount of digital postage;

b) determining an initial pointer value;

c) providing a random sequence of bits associated with the pointer value having a length corresponding to the amount of digital postage requested; and d) providing as digital postage the random sequence of bits and the initial pointer value.

7. The method of claim 6, further comprising the step of providing as verifying data at least a portion of the bitstream and the initial pointer value.

8. The method of claim 6, wherein the random sequence of bits is generated using a key value, and further comprising the step of providing as verifying data the key value and the initial pointer value.

9. The method of claim 8, wherein the random sequence of bits is generated as portions of one or more random sequences of bits, each sequence based on the same initial pointer value but incremented for a successive sequence by an amount equal to the number of bits in the previous sequence.

10. The method of claim 9, wherein at least one of the random sequence of bits is generated based on a triple data encryption.

11. A system for enabling the use of digital coins comprising:

a digital coin generator, responsive to a request for digital coins, for providing a supply of digital coins based on a random sequence of bits, and further for providing verifying data for use in verifying portions of the digital coins, the digital coin generator including a bitstream generator for providing a random sequence of bits assciated with an initial pointer value and having a length corresponding to the amount of digital coins requested; and a digital coin manager for providing as the digital coins the random sequence of bits and the initial pointer value, and for providing as verifying data information indicating at least a portion of the random sequence of bits.

12. The system of claim 11, wherein the information indicating at least a portion of the random sequence of bits includes the initial pointer value and at least a portion of the random sequence of bits.

13. The system of claim 11, wherein the digital coin generator is further responsive to a key value and the bitstream generator provides the random sequence of bits based on the key value as well as the initial pointer value, and wherein the information indicating at least a portion of the random sequence of bits includes the key value and the initial pointer value.

14. The system of claim 13, wherein the random sequence of bits is generated as portions of one or more random sequences of bits, each sequence based on the same initial pointer value but incremented by a pre-determined number of bits for each successive sequence.

15. The system of claim 14, wherein the random sequence of bits is generated based on a triple data ecryption.

16. A method for enabling the use of digital coins, comprising the steps of:

a) receiving a request for a certain amount of digital coins;

c) determining an initial pointer value;

b) providing a random sequence of bits associated with the initial pointer value and having a length corresponding to the amount of digital coins requested; and d) providing as digital coins the random sequence of bits and the initial pointer value.

17. The method of claim 16, further comprising the step of providing as verifying data at least a portion of the bitstream and the initial pointer value.

18. The method of claim 16, wherein the random sequence of bits is generated using a key value, and further comprising the step of providing as verifying data the key value and the initial pointer value.

19. The method of claim 18, wherein the random sequence of bits is generated as portions of one or more random sequences of bits, each sequence based on the same initial pointer value but incremented for a successive sequence by an amount equal to the number of bits in the previous sequence.

20. The method of claim 19, wherein the random sequence of bits is generated based on a triple data encryption.

* * * * *